United States Patent
Stroila et al.

(10) Patent No.: US 12,265,633 B2
(45) Date of Patent: Apr. 1, 2025

(54) CONTEXT BASED PRIVACY RISK FOOTPRINT AND INCIDENT PROTECTION

(71) Applicant: Allstate Insurance Company, Northbrook, IL (US)

(72) Inventors: Matei Stroila, Chicago, IL (US); Surender Kumar, Palatine, IL (US); Chanakykumar Bhavsar, Naperville, IL (US)

(73) Assignee: Allstate Insurance Company, Northbrook, IL (US)

( * ) Notice: Subject to any disclaimer, the term of this patent is extended or adjusted under 35 U.S.C. 154(b) by 592 days.

(21) Appl. No.: 17/116,354

(22) Filed: Dec. 9, 2020

(65) Prior Publication Data

US 2022/0179978 A1    Jun. 9, 2022

(51) Int. Cl.
| | | |
|---|---|---|
| G06F 21/60 | (2013.01) |
| G06F 21/62 | (2013.01) |
| G06N 5/04 | (2023.01) |
| G06N 20/00 | (2019.01) |

(52) U.S. Cl.
CPC ........ G06F 21/604 (2013.01); G06F 21/6245 (2013.01); G06N 5/04 (2013.01); G06N 20/00 (2019.01); *G06F 2221/2101* (2013.01)

(58) Field of Classification Search
CPC ............... G06F 21/604; G06F 21/6245; G06F 2221/2101; G06N 20/00; G06N 5/04
See application file for complete search history.

(56) References Cited

U.S. PATENT DOCUMENTS

| | | | |
|---|---|---|---|
| 9,607,336 B1 * | 3/2017 | Dean | H04L 67/55 |
| 9,807,094 B1 | 10/2017 | Liu et al. | |
| 9,843,584 B2 | 12/2017 | Clark et al. | |
| 10,102,570 B1 * | 10/2018 | Kapczynski | G06Q 40/02 |

(Continued)

FOREIGN PATENT DOCUMENTS

| | | |
|---|---|---|
| CN | 106682527 A | 5/2017 |
| CN | 110866263 A | 3/2020 |
| WO | 2017187207 A1 | 11/2017 |

OTHER PUBLICATIONS

Khazaei et al., DetectingPrivacyPreferencesFromOnLineSocial Footprints:ALiteratureReview, iConference 2016 (Year: 2016).*

(Continued)

*Primary Examiner* — Luu T Pham
*Assistant Examiner* — Paul J Skwierawski
(74) *Attorney, Agent, or Firm* — Polsinelli PC

(57) ABSTRACT

Methods, computer-readable media, software, systems and apparatuses may receive, from a user device, notification of a user enrolling in a privacy incident protection application, receive, from the user device, user account information associated with one or more user accounts of the user, where the user account information includes a plurality of contextual settings, determine a risk footprint associated with the user based on the user account information, monitor the one or more user accounts, receive an indication of an incident based on monitoring the one or more user accounts and based on the risk footprint, and transmit an incident notification to a data server provider associated with the incident. The incident notification may include instructions to perform a mitigation action associated with the incident.

18 Claims, 6 Drawing Sheets

(56) References Cited

U.S. PATENT DOCUMENTS

| | | |
|---|---|---|
| 10,133,878 B2 | 11/2018 | Horvitz et al. |
| 10,572,684 B2 | 2/2020 | LaFever et al. |
| 2014/0359777 A1* | 12/2014 | Lam ................ G06F 21/577 |
| | | 726/25 |
| 2015/0019328 A1* | 1/2015 | Abhyanker ....... G06Q 30/0261 |
| | | 705/14.58 |
| 2016/0164915 A1 | 6/2016 | Cook |
| 2018/0232534 A1* | 8/2018 | Dotan-Cohen ..... H04W 12/033 |
| 2019/0098056 A1 | 3/2019 | Pitre et al. |
| 2019/0138930 A1 | 5/2019 | Margiolas |
| 2019/0230086 A1 | 7/2019 | Song et al. |
| 2019/0334886 A1 | 10/2019 | Lelcuk et al. |
| 2019/0362069 A1* | 11/2019 | Park ................ G06F 16/904 |
| 2020/0004938 A1* | 1/2020 | Brannon ............ G06F 11/3438 |
| 2020/0050966 A1 | 2/2020 | Enuka et al. |
| 2020/0089848 A1* | 3/2020 | Abdelaziz ............ H04L 63/308 |
| 2020/0134211 A1 | 4/2020 | Miller et al. |
| 2020/0137097 A1 | 4/2020 | Zimmermann et al. |
| 2020/0159960 A1 | 5/2020 | Jakobsson |
| 2020/0184488 A1* | 6/2020 | Ebel .................. G06Q 20/4016 |
| 2020/0193057 A1 | 6/2020 | Yu et al. |
| 2020/0257783 A1* | 8/2020 | Brannon ............. G06F 21/316 |
| 2021/0374754 A1* | 12/2021 | Pandian ............ G06Q 20/4016 |

OTHER PUBLICATIONS

Khazaei, et al, "Detecting Privacy Preferences from Online Social Footprints: A Literature Review", iConference 2016.

Prajit Kumar Das, "Context-Dependent Privacy and Security Management on Mobile Devices", Aug. 22, 2017, University of Maryland Baltimore County.

Linden, et al., "The Pricacy Policy Landscape After the GDPR", Proceedings on Privacy Enhancing Technologies, 2020, pp. 47-64.

International Search Report and Written Opinion Of The International Searching Authority for International application No. PCT/US2021/062123 dated Mar. 18, 2022 (13 pages).

* cited by examiner

CONTEXT BASED PRIVACY RISK FOOTPRINT AND INCIDENT PROTECTION

FIELD OF ART

Aspects of the disclosure generally relate to methods and computer systems, including one or more computers particularly configured and/or executing computer software to identify a privacy risk footprint and prevent and remediate privacy incidents associated with user account applications or services. More specifically, aspects of this disclosure relate to context-based privacy risk footprint and incident protection systems and methods.

BACKGROUND

Applications and services may collect data, which in some cases may include sensitive information. In some instances, data collection may be utilized to provide certain features and/or functionalities to users. However, in other instances, data may be collected solely to facilitate targeted advertising and other marketing strategies. Furthermore, such collected data may be sold or otherwise provided to other companies. In some instances, there may be a privacy risk associated with user account data due to security vulnerabilities in a system.

Application developers and service providers may generally disclose a type, nature, and/or amount of data collected by the software or service. However, end users may not be attentive to such disclosures. Users may also not understand the risks, and may be unaware of data being collected, e.g., due to a large number of applications and services they may be using. Also, in some instances, users may not understand the full scope of such data collection. For example, parents may not fully understand an extent and/or type of data that may be collected by applications or services being used by their children.

Accordingly, there may be an advantage to automatically monitor data use by various applications or services associated with a particular user to determine a privacy risk footprint associated with those applications and services. In some aspects, it may be advantageous to automatically identify and recommend applications and/or services that may carry a lower privacy risk, or to provide recommendations for personalized privacy best practices based on the privacy risk footprint of a user.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for a context-based privacy risk footprint and incident protection system profiling based on data extraction.

In some aspects, an apparatus may include a display, one or more processors, memory storing computer-readable instructions that, when executed by the one or more processors, cause the apparatus to: receive, from a user device, notification of a user enrolling in a privacy incident protection application; receive, from the user device, user account information associated with one or more user accounts of the user, where the user account information includes a plurality of contextual settings; determine a risk footprint associated with the user based on the user account information; monitor the one or more user accounts; receive an indication of an incident based on monitoring the one or more user accounts and based on the risk footprint; and transmit an incident notification to a data server provider associated with the incident. The incident notification may include instructions to perform a mitigation action associated with the incident.

In some aspects, the memory may store additional computer-readable instructions that, when executed by the one or more processors, further cause the apparatus to generate a privacy risk footprint interface for display on the user device. The privacy risk footprint interface may include at least one interactive risk element associated with the one or more user accounts and the plurality of contextual settings. The privacy risk footprint interface may include a privacy risk score element configured to interactively display the risk score and user account information related to the risk score. The at least one interactive risk element may include an information protection interactive element displaying instructions to protect a component of compromised user account information determined based on the risk footprint.

In some aspects, the at least one interactive risk element may include an account privacy interactive element displaying instructions to adjust a privacy setting on one or more user accounts.

In some arrangements, the memory may store additional computer-readable instructions that, when executed by the one or more processors, further cause the apparatus to transmit an incident notification user interface to the user device. The incident notification user interface may be configured to display information related to the incident notification on the user device.

In other aspects, the plurality of contextual settings may include at least one of: user account preferences, user account activity, user account information sharing activity, user account settings, or user device settings. In some arrangements, the memory may store additional computer-readable instructions that, when executed by the one or more processors, further cause the apparatus to automatically mask user information related to the one or more user accounts in accordance with the plurality of contextual settings.

In some aspects, determining the risk footprint may include determining a privacy risk score by applying a machine learning model to user activity information associated with the one or more user accounts and calculating the risk footprint based, at least in part, on the privacy risk score. In some arrangements, determining the risk footprint may include computing a privacy risk score using graphic analytics based on the plurality of contextual setting and user activity information associated with the one or more user accounts. In some arrangements, the memory may store additional computer-readable instructions that, when executed by the one or more processors, further cause the apparatus to transmit an alert to the user device upon determining that the risk footprint exceeds a risk threshold.

In some aspects, the memory may store additional computer-readable instructions that, when executed by the one or more processors, further cause the apparatus to generate, using a recommendation engine, a personalized privacy best practice report based on the risk footprint, and transmit the personalized privacy best practice report to the user device.

The personalized privacy best practice report may be configured to be displayed on an interface of the user device.

In some examples, monitoring the one or more user accounts includes performing a user account audit at an audit interval. The audit interval may be selected based on the risk footprint. Monitoring the one or more user accounts may include performing a user account audit responsive to receiving audit instructions from the user device. In some arrangements, monitoring the one or more user accounts may include receiving privacy contextual information associated with user activity on the one or more user accounts. The privacy contextual information may include at least one of a location descriptor, an activity descriptor, or a privacy policy descriptor. In some examples, the privacy contextual information may include an interaction between a user sharing activity and one or more situational settings associated with the user sharing activity.

In accordance with further aspects of the present disclosure, a method disclosed herein may include receiving, from a user device, an enrollment notification of a user enrolling in a privacy incident protection application. The enrollment notification may include user account information associated with one or more user accounts of the user, and a plurality of contextual settings. The method may include determining a risk footprint associated with the user based on the user account information, receiving an indication of an incident based on monitoring the one or more user accounts and based on the risk footprint, and transmitting an incident notification to a data server provider associated with the incident. The incident notification may include instructions to perform a mitigation action associated with the incident.

In some aspects, the method may further include determining a privacy risk score by applying a machine learning model to user activity information associated with the one or more user accounts, and calculating the risk footprint based, at least in part, on the privacy risk score.

In some aspects, the method may further include generating a privacy risk footprint interface for display on the user device. The privacy risk footprint interface may include at least one interactive risk element associated with the one or more user accounts and the plurality of contextual settings.

In accordance with further aspects of the present disclosure, a system disclosed herein may include a first computing device in signal communication with at least one other computing device. The first computing device may include a display, a processor, and memory storing instructions that, when executed by the processor, cause the first computing device to: receive, from a user device, notification of a user enrolling in a privacy incident protection application; receive, from the user device, user account information associated with one or more user accounts of the user and including a plurality of contextual settings; determine a risk footprint associated with the user based on the user account information; receive an indication based on monitoring the one or more user accounts and based on the risk footprint; and transmit a notification user interface to the user device. The notification user interface may be configured to display information related to the indication on the user device.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below.

Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for a context-based privacy risk footprint and incident protection system. As described herein, applications and services may collect data, such as, for example, sensitive, personal, and/or private information (e.g., during use of the application or service, in registering for use of the application or service, or the like). For example, an application or service may require a name, date of birth, location information, email address, and so forth. In some instances, such sensitive information may not be necessary to provide features and/or functionalities of the application or service to users.

Generally, when users are made aware of risks to their privacy, they may take steps to mitigate that risk. For example, users may deny access to personal data to a particular application or service, or they may not use a particular application or service, and/or they may switch to another application or service that does not collect personal data, or collects less information. Accordingly, as described herein, a context-based privacy risk footprint and incident protection system may utilize user privacy settings and/or disclosures published by application developers and service providers to estimate or predict privacy risks inherent in such applications and services, and may take steps to determine privacy incidents and remediate those privacy incidents in accordance with user configuration settings.

In the following description of the various embodiments of the disclosure, reference is made to the accompanying drawings, which form a part hereof, and in which is shown by way of illustration, various embodiments in which the disclosure may be practiced.

It is to be understood that other embodiments may be utilized and structural and functional modifications may be made.

Figure 1:
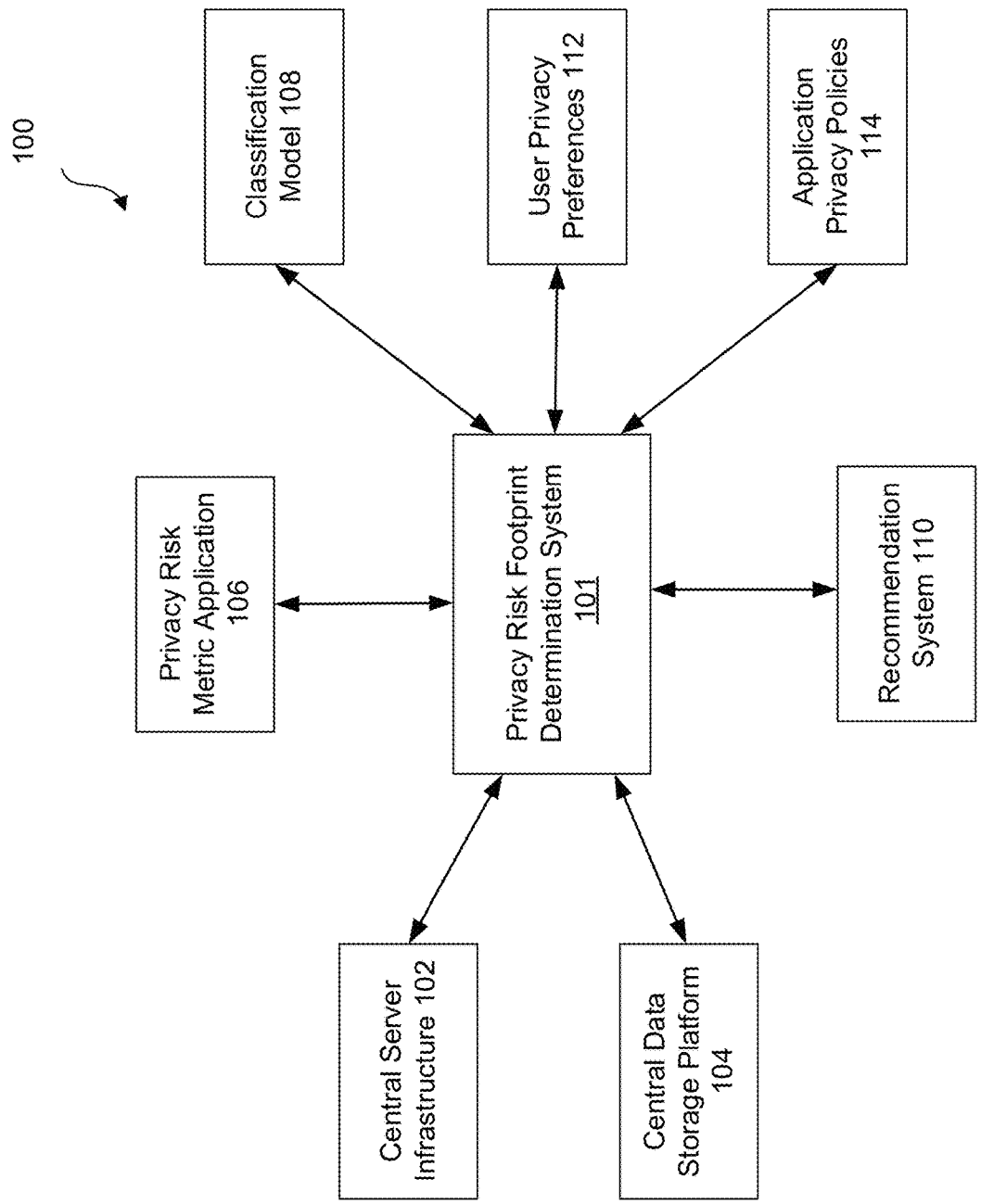
FIG. 1 illustrates a block diagram illustrating the system architecture for a privacy risk footprint and incident protection system in accordance with one or more aspects described herein.
Figure 2:
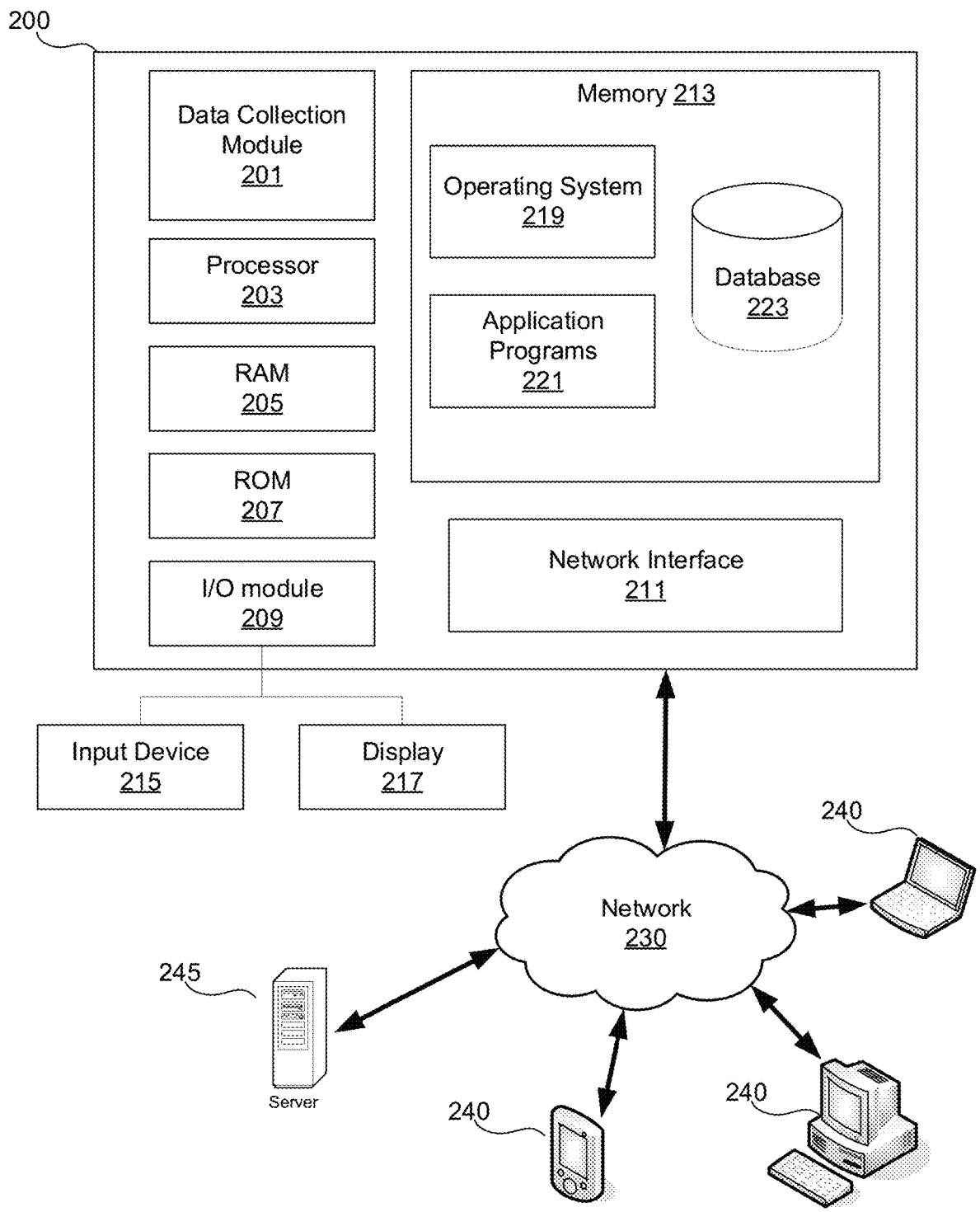
FIG. 2 illustrates a privacy risk footprint and incident protection device that may be used in accordance with one or more aspects described herein.

FIG. 1 shows a block diagram illustrating system architecture 100 for a context-based privacy risk footprint and incident protection system profiling in accordance with one or more aspects described herein. A privacy risk footprint determination system 101 may retrieve, via a computing device and over a network, information related to one or more characteristics of a particular application or service deployed in a computing environment. In some instances, the privacy risk footprint determination system 101 may be or include one or more components of privacy risk footprint and incident protection device 200, as shown in FIG. 2.

Applications or services may be provided via various servers over the world wide web ("WWW"), or may be downloaded by computing devices (e.g., smartphones, tablet computing devices, or the like) to be run locally. Generally, such applications or services collect user information. For example, websites may collect user information via cookies, which may track, collect, and/or store data related to a user's browsing activity. In some instances, such user information may be utilized to improve a feature or functionality of an application or service. In some instances, such information may be collected to customize the application or service to enhance user experience.

With the advent of mobile computing devices, software programs (or mobile applications) for operating systems run on a mobile device have become widely prevalent. For example, mobile applications may be configured to run on a variety of operating systems. Such mobile applications may collect user information and share it with others within an ecosystem, such as, for example, OS developers, app store platforms, advertisers, service providers, device manufacturers, other users, and so forth.

The privacy risk footprint determination system 101 may utilize user privacy settings and/or disclosures published by application developers and service providers to estimate or predict privacy risks inherent in such applications and services. In some aspects, the privacy risk footprint determination system 101 may identify applications or services that provide similar functionality, but that may have a lower risk profile. For example, the privacy risk footprint determination system 101 may collect disclosure information provided by application developers and service providers, and then utilize such information to identify applications or services that may be collecting more personal data of a given type or types relative to other similar applications or services.

Accordingly, the privacy risk footprint determination system 101 may provide context-based privacy risk footprint analysis and incident protection. The privacy risk footprint determination system 101 may use analytics such as machine learning models and graph technology to predict risks based on a user's preferences and behaviors. For example, the privacy risk footprint determination system 101 may determine a user's privacy risk footprint based on the user's information sharing activities in specific contexts. The privacy risk footprint determination system 101 may audit the user's online accounts regularly and/or on demand in order to protect the privacy information and update user's privacy footprint. In some instances, the privacy risk footprint determination system 101 may remediate incidents by alerting the user and filing privacy incidents with one or more specific data services providers in order to delete potentially compromised sensitive data. In some instances, the privacy risk footprint determination system 101 may inform users about personalized privacy best practices.

In some aspects, the privacy risk footprint determination system 101 may provide a personalized risk graph based on user data (received contingent with user consent) that visually depicts privacy risks and allows users to manage risks in a personalized manner In that regard, graph technology and machine learning may be used to understand relationships in user data.

User data collected by the privacy risk footprint determination system 101 may include a variety of information, such as a type of data that is collected and/or shared, a purpose for such data, how the data may be used, where the data may be stored, who the data may be shared with (names and websites of third parties), and so forth. In some instances, the information may include personal data, such as, for example, personally identifiable information, personal health information, and/or personal credit information. For example, an application that provides email services may collect a user's name, date of birth, gender, contact information, location data, content of messages, and so forth. As another example, an application that provides health related services may collect a user's name, date of birth, gender, height, weight, contact information, location data, biometric information, health insurance information, health information, prescription information, and so forth. As another example, an application that provides financial services may collect a user's name, date of birth, gender, contact information, location data, financial information, employment information, salary, retirement-related information, information related to a trading portfolio, credit card information, and the like.

In some instances, an application or service may collect "pseudonymous" or "anonymous" data that may be used to customize features to user requirements. However, such pseudonymous or anonymous data may, in aggregate, disclose personally identifiable information. For example, data from a global positioning system ("GPS") may be combined with gender, demographic data, and/or age range data, to identify an individual.

Generally, application developers and service providers may provide disclosures related to the information that may be collected. For example, the information related to the one or more characteristics of a particular application or service may include information, such as, whether data is being shared with third party advertisers for advertising (e.g., behavioral advertising) purposes. Also, for example, the information may include transactional data (e.g., credit card numbers) that may be shared across various platforms. In some instances, an application or service may access a microphone or a camera or camera roll associated with a user device, and collect information via the microphone or the camera. In some instances, an application or service may access a text messaging application, a phone application and/or calendar application associated with a user device, and collect contact information via such applications. As another example, the information may include location data, such as an internet protocol ("IP") address utilized to access the application or service, GPS data, navigation data from a map application, and so forth.

There are a number of factors related to private information becoming more easily disclosed to unintended audiences (e.g., as part of a privacy incident), including users more often relying on online services for a variety of uses. As discussed herein, such online services may collect large amounts of personal data, which may be shared intentionally or unintentionally with third parties. Additionally, such online services may have both personal and professional applications while the boundary between these continues to blur. The lack of boundaries between different aspects of users' lives when using a variety of online services creates a multitude of contextual situations, which may be considered as part of the privacy risk footprint analysis and incident protection systems and methods as described herein.

In some embodiments, the privacy risk footprint determination system 101 may detect, via a computing device and over a network, a particular application or service deployed in a computing environment. For example, the privacy risk footprint determination system 101 may detect applications or services that may be installed in a computing device. As another example, the privacy risk footprint determination system 101 may detect applications or services that may be available over a network, such as a local area network ("LAN"), wide area network ("WAN"), a wireless local area network ("WLAN"), a storage area network, a server area network, and so forth.

Initially, the privacy risk footprint determination system 101 may determine a user's privacy risk footprint and thereafter my monitor user accounts for the detection of privacy incidents. For example, upon obtaining user consent, the privacy risk footprint determination system 101 may detect context-based privacy sensitive information that may have the potential to be shared (e.g., willingly or unwillingly) and may use data analytics, such as machine learning models or graph analytics, to predict risks based on user preferences and behaviors.

The privacy risk footprint determination system 101 may detect context-based privacy incidents. For example, in a location context, context-based privacy incidents may include sharing locations in unsafe zones (e.g., high crime areas, infectious diseases hot spots, etc.), social media content with location tags in unsafe zones. In some examples, such a location context may be considered in combination with a temporal context (time of the day) for detecting context-based privacy incidents. As another example, in an activity context, as part of a user's job search, context-based privacy incidents may include certain posts on social media with provocative, inappropriate, or discriminatory comments. In a shopping context, context-based privacy incidents may include sharing ads while a user is shopping so as to potentially negatively influence an offer price, or sharing unhealthy habits on social media while shopping for health insurance. In a privacy policy context, context-based privacy incidents may include misalignment of specific account settings with privacy policy agreement. In other contexts, context-based privacy incidents may include social media posts about a user or from a user account that does not match user social behavior (e.g., indicating a possibility of an account being hacked), online information about a user after data breaches, or posting of information following identity theft. Such examples are provided for illustrative purposes. Numerous other examples of context-based privacy incidents may be provided without departing from the scope of the present disclosure.

In some examples, contexts may include one or more of: (1) whether the particular application or service enables sharing with other users over the network, (2) whether the application or service incorporates opportunities to purchase other products or services, and (3) whether the particular application or service enables an offering of a commercial advertisement. In some embodiments, contexts may include whether the application or service incorporates opportunities to purchase other products or services. In some examples, attributes of a current device configuration of a device hosting the application may be provided to a third-party, and the third-party may then tailor its offerings of products to the user via the platform. In some embodiments, contexts may include whether the particular application or service enables an offering of a commercial advertisement. For example, applications or services may provide a platform to third parties to provide advertisements. For example, in an email application, a service provider may perform contextual analysis of the content of an email, and provide anonymized user preferences to a third-party, and the third-party may then tailor its advertisements to the user. In some arrangements, contexts may include a content rating for the particular application or service. For example, application developers and service providers may indicate a content rating for the applications and services. The content rating may be generally indicative of a type of content, and an intended target audience of users.

In some arrangements, the class of applications or services may include one of: a gaming application, a productivity application, and a music application. Generally, the term "application" may refer to any software application. Such software applications may include a variety of types of applications, which may be classified based on their functionalities. For example, the class of applications or services may include gaming applications. In some embodiments, the class of applications or services may include a sub-class of gaming applications, such as, for example, virtual reality applications, enhanced reality applications, applications that may be downloaded from a mobile application store, applications that have predominantly violent content, applications that are educational, and so forth.

As another example, the class of applications or services may include a productivity application. Generally, such applications may be used to create, manage, store, share, and/or edit documents associated with word processing, graphic design, presentation, data management, spreadsheet, and so forth.

Also, for example, the class of applications or services may include a music application. Generally, a music application may be used to create, synthesize, write, record, broadcast, and otherwise manipulate and/or disseminate music. Also, for example, a music application may include an application for music analysis, music education, music related games, orchestration software, samplers, sequencers, and so forth.

In some embodiments, privacy risk footprint determination system 101 may retrieve information related to one or more contexts of a plurality of applications or services deployed in a computing environment. For example, privacy risk footprint determination system 101 may retrieve information from disclosures provided by application developers and service providers for the plurality of applications or services deployed in the computing environment. In some embodiments, privacy risk footprint determination system 101 may retrieve such information periodically or in real-time. For example, an application developer may release a new version of an application, and the release notes may be indicative of a type of information that will be collected. Accordingly, privacy risk footprint determination system 101 may compare the information with existing information about the older version of the application to determine if there are updates to the information that is collected, updates to a privacy policy, and so forth.

In some embodiments, privacy risk footprint determination system 101 may extract the information related to the one or more characteristics from one or more of a description and a review of the particular application or service. For example, applications or services generally include a description. Accordingly, privacy risk footprint determination system 101 may extract the information from the description. For example, a natural language processing technique (NLP) may be utilized to analyze and extract relevant information. As another example, privacy risk footprint determination system 101 may analyze a content of the review and determine that the particular application or service collects user data.

In some embodiments, the privacy risk footprint determination system 101 may determine, for each application or service in the associated class, a type of personal data collected. For example, a music application that provides digital content delivery may collect data related to musical preferences, playlists that are created, moods, behavioral aspects, social networks, sharing habits, genres, ethnicity, genre, and so forth, to customize delivery of content. Additionally, some music applications may enable a user to voluntarily share additional information that may be shared with third-parties. For example, payment data may be shared to purchase content, information related to mobile data may be shared to enhance streaming services, and so forth. As another example, a video delivery service may collect data related to user preferences, demographics, location data, quality of internet service, and so forth, to deliver tailored video content.

Although applications and services provide a user with an ability to change their privacy restrictions, users often forget to edit their preferences after the application or service is first installed. Also, for example, children may often download and install software applications without an understanding of potential privacy issues. As another example, privacy requirements, data collection activities, etc. may continue to change during a lifecycle of an application. As another example, a user may have consented to provide data for one instance of use of the application, but may have inadvertently consented to continued use and/or access to the data. Accordingly, it may be helpful to monitor types of applications or services, and data collected by these applications or services.

The privacy risk footprint determination system 101 may audit one or more user accounts, at a specified interval or on-demand, and may update a privacy risk footprint for the user. For example, the privacy risk footprint may be updated by reviewing user account settings using risk indexes for a variety of contexts. Depending on a typical temporal distribution of privacy incidents, audits may be performed anywhere from real time to on demand, e.g., based on user preferences and user consent.

Privacy risk metric application 106 may be configured to include one or more applications that may determine, for the particular application or service, a risk metric indicative of a type of personal data collected by the particular application or service in relation to the type of personal data collected by other applications or services in the associated class. Generally, the risk metric provides a quantitative measurement of relative risk profiles of applications or services. Applications or services in a given class may utilize personal data collected from users to provide features. However, some applications or services may collect more personal data than others. For example, two word processing applications may provide similar functionalities, but may collect varying degrees of personal data. Accordingly, the word processing application that collects more personal data may be associated with a higher risk metric than a word processing application that collects less personal data.

In some embodiments, privacy risk metric application 106 may be configured to determine a probability that an application or service in the associated class collects personal data. For example, applications that provide navigation services generally collect real-time location data to provide updates and alerts related to traffic incidents, routes, tollways, congestion, and so forth. Accordingly, the class of navigation related applications may be associated with a high probability of collecting location data. As another example, a real estate application may collect location data to provide recommendations and alerts for properties that are on sale or are for rent. Real estate applications may also collect such location data and provide it to third-parties for targeted advertisements related to financing options, insurance options, home goods and appliances, and so forth. Accordingly, the class of real estate related applications may be associated with a high probability of collecting location data.

However, there may be web browsing applications that allow a user to navigate online resources anonymously without collecting personal data. A class comprising such applications may be associated with a low probability of collecting location data. Also, for example, another class of web browsing applications may not allow a user to navigate online resources anonymously, and may collect personal data. Accordingly, a second class comprising such applications may be associated with a high probability of collecting location data. Similar probabilities may be associated with a class that comprises both types of web browsing applications. Although the examples illustrate determining a probability based on location data, similar techniques may be applied to determine a probability based on other forms of personal data. In some embodiments, privacy risk metric application 106 may be configured to determine the risk metric based on the probability.

In some embodiments, privacy risk metric application 106 may be configured to determine, for the associated class, a composite risk metric indicative of a type of personal data collected by the applications or services in the associated class, where the composite risk metric is an aggregate of risk metrics of applications or services in the associated class. For example, in a class of music applications or services, each application or service may be associated with a risk metric. Accordingly, privacy risk metric application 106 may aggregate these individual risk metrics to determine a risk metric for the class of music applications or services. In some embodiments, the aggregate risk metric may be a normalized sum of the individual risk metrics. In some embodiments, the aggregate risk metric may be a normalized sum of weighted individual risk metrics. Other methods of value aggregation may be used such as, for example, a mean, median, or mode of the individual risk metrics.

In some embodiments, privacy risk footprint determination system 101 may utilize a classification model 108 to cluster, based on the information, the plurality of applications or services into a plurality of contexts. The classification model 108 may utilize one or more machine learning tools such as, for example, a linear regression, a decision tree, a support vector machine, a random forest, a k-means algorithm, gradient boosting algorithms, dimensionality reduction algorithms, and so forth. For example, classification model 108 may be provided with training data comprising information related to one or more contexts, and applications or services that have been determined to share such contexts. Accordingly, classification model 108 may be trained, for example, via supervised learning techniques, based on such labeled data, to learn an association between the one or more contexts and applications or services. Based on such information, classification model 108 may be trained to determine additional clusters.

In some instances, information related to one or more contexts may be unstructured, and a combination of supervised and semi-supervised learning techniques may be utilized to train classification model 108. For example, classification model 108 may be configured to detect patterns in information related to one or more contexts, and apply these patterns to detect a type of data being collected. Also, for example, classification model 108 may be configured to detect patterns between types of applications or services. The classification model 108 may be configured to analyze such and other factors, determine patterns, and determine clusters based on such patterns. In some embodiments, an output of the classification model 108 may be reviewed by a human operator. Accordingly, the human operator may confirm the analysis or modify it, and this may form additional training data for the classification model 108.

In some embodiments, classification model 108 may generate feature vectors indicative of the one or more characteristics of an application or service. Such feature vectors may be compared, based on similarity or other distance measuring metrics, to determine applications or services that are proximate to each other. Accordingly, applications or services may be clustered based on similarity of the one or more contexts.

In some examples, classification model 108 may associate, in a database (e.g., central data storage platform 104), each application or service of the first plurality of applications or services with a class of the second plurality of classes. For example, a gaming application may be associated with a class of gaming applications, a music application may be associated with a class of music applications, and so forth. In some embodiments, one application may be associated with more than one class. For example, a music application may provide a platform to stream music, and may also provide a music-themed gaming application. Accordingly, such a music application may be associated with the class of gaming applications and the class of music applications.

The central data storage platform 104 may be incorporated into the privacy risk footprint determination system 101 or may be separate components. As an example, central data storage platform 104 may be configured to store, for each class of applications, the applications or services that are associated with that class. Also, for example, central data storage platform 104 may be configured to store, for each application or service, one or more characteristics of the application or service. As another example, central data storage platform 104 may be configured to store, for each application or service, a risk metric associated with the application or service, and/or a composite risk metric associated with the class of applications or services. In some embodiments, central data storage platform 104 may be configured to be indexed so as to be a readily searchable database.

The data stored in central data storage platform 104 may be collected and compiled by privacy risk footprint determination system 101, risk metric application 106, recommendation system 110, and classification model 108, or by servers and subsystems within privacy risk footprint determination system 101. In some embodiments, privacy risk footprint determination system 101 may collect information from, and transmit information to, each of the various applications, databases, devices, and backend servers described in FIG. 1.

In some embodiments, the privacy risk footprint determination system 101 may utilize recommendation system 110 to recommend, via the computing device and based on the risk metric, an additional or alternative application or service with a lower risk than the particular application or service. For example, privacy risk footprint determination system 101 may identify applications or services that provide similar functionality, but that may have a lower risk profile (e.g., a lower risk metric). For example, privacy risk footprint determination system 101 may identify applications or services that may be collecting more personal data of a given type relative to other similar applications or services. Accordingly, recommendation system 110 may recommend the applications or services that have a lower risk profile. The recommendation system 110 may be configured to recommend actions or alerts to prevent privacy incidents based on contexts. For example, if a user selects the configurable option, the privacy risk footprint determination system 101, in combination with the recommendation system 110, may automatically take appropriate actions on behalf of the subscriber to prevent privacy incidents.

In some embodiments, recommendation system 110 may recommend the additional application or service based on the composite risk metric. For example, the class associated with the first application and the second application may have a composite risk metric of 0.3. Accordingly, since the risk metric associated with the second application, 0.2, is a lower value than the composite risk metric of 0.3, privacy risk footprint determination system 101 may identify the second application to have a lower risk profile, and recommendation system 110 may recommend the second application to a user.

The privacy risk footprint determination system 101 may collect information from, and transmit information to, a user through various different channels, as will be described in more detail below. In some embodiments, the privacy risk footprint determination system 101 may receive a request from a user for a product or service and may transmit the request to an application or service identified by the request. Upon receiving the request, the privacy risk footprint determination system 101 may compare the user privacy preferences 112 with application privacy policies 114, which may include a privacy policy associated with the application or service.

The user privacy preferences 112 may represent the privacy preferences of the user who sent the request. In some embodiments, the user privacy preferences 112 may be associated with the computing device sending the request. In some embodiments, the user privacy preferences 112 may have been previously stored by the privacy risk footprint determination system 101, for example, in a local database or in the central data storage platform 104. In other embodiments, the user privacy preferences 112 may be received by the privacy risk footprint determination system 101 as part of the request sent by the user. In still other embodiments, the privacy risk footprint determination system 101 may retrieve the user privacy preferences 112 from a computing device via a network, for example, after receiving the request from the user. In some embodiments, the privacy risk footprint determination system 101 may be configured with artificial-intelligence capabilities to understand a user's preference based on the user's usage over time.

The application privacy policies 114 may include privacy policies of one or more applications or services. As noted above, the application privacy policies 114 may include the privacy policy associated with an application website. For example, the privacy policy associated with the application may have been previously stored by the privacy risk footprint determination system 101, for example, in a local database or in the central data storage platform 104. In some other embodiments, the privacy policy associated with the application may be retrieved from the application website, or from another location, for example, after receiving the request from the user. In various embodiments, the privacy risk footprint determination system 101 may process or translate one or more application privacy policies into an internal format appropriate for comparing with the user's privacy preferences.

Upon determining that the privacy policy associated with the application matches, or is otherwise compatible with, the user privacy preferences 112, the privacy risk footprint determination system 101 may send the request to the application. Alternatively, the privacy risk footprint determination system 101 may determine that the privacy policy associated with the application does not match, or is not compatible with, the user privacy preferences 112, and if so, the privacy risk footprint determination system 101 may respond to the request from the user by providing various indications to that effect. For example, the privacy risk footprint determination system 101 may respond with an indication that the application privacy policies 114 associated with the application do not match the user privacy preferences 112. The indication may include visual and/or audio indications, such as a warning message or symbol.

In some embodiments, the privacy risk footprint determination system 101 may determine one or more alternative applications that offer similar products or services and, the privacy risk footprint determination system 101 may respond with indications of the alternative applications. For example, the response may include information, which when displayed, provides visual indications of the alternative application. In some embodiments, the visual indications may include indications as to how closely the privacy policies of one or more alternative application matches the user privacy preferences 112.

In some embodiments, after responding with the indications of the alternative application, the privacy risk footprint determination system 101 may receive a request from the user indicative of a selection of one of the alternative applications. The privacy risk footprint determination system 101 may subsequently send the request to the selected alternative application. In these embodiments, the privacy risk footprint determination system 101 may record the selection made by the user and, if a request identifying application is again received from the user, the privacy risk footprint determination system 101 may automatically send, or offer to send, the request to the selected alternative application. In some embodiments, this automatic behavior may be available as a user-configurable feature. In some embodiments, automatic substitution may be prevented when the privacy policy of the application has changed subsequent to the previous visit.

In some embodiments, the user privacy preferences 112 may include information related to one or more privacy categories. The application privacy policies 114 may be compared to the user privacy preferences 112 by comparing information in each of the privacy categories. In some embodiments, the privacy categories may include categories generally related to data collection, data usage, and data management. As an example, the user privacy preferences 112 may indicate that the user does not want collected personal data to be shared by the application. In another example, the user privacy preferences 112 may indicate that the user wants to be able to delete collected personal data stored by the application. In still another example, the user privacy preferences 112 may indicate that the user wants to be able to opt in, or opt out of, having personal data collected by the application. The application privacy policies 114 may include information indicating the application's policy related to one or more of these privacy categories.

In some embodiments, privacy risk footprint determination system 101 may communicate with central server infrastructure 102 and receive data related to changes in disclosure information, changes in data collection, user enabled restrictions, etc. Privacy risk footprint determination system 101 may collect real-time data from applications and/or services deployed in the computing environment. In some examples, real-time data may be transmitted by the privacy risk footprint determination system 101 (e.g., via the privacy risk metric application 106, the recommendation system 110, and the classification model 108, and so forth) to the central server infrastructure 102.

In some instances, the privacy risk footprint determination system 101 may remediate privacy incidents. The privacy risk footprint determination system 101 may send an alert to the user if a privacy incident is detected. For example, if a new post from a user's account does not match the user's behavior, then the privacy risk footprint determination system 101 may transmit an alert to the user. In that regard, privacy incidents may be context-based on accordance with the privacy risk footprint of the user. In some instances, the privacy risk footprint determination system 101 may file privacy incidents with an associated data service provider (e.g., LinkedIn, Twitter, and the like) to delete specified sensitive data items from the user's account on behalf of the user. Social media sites often update their privacy settings frequently, e.g., to comply with the evolving regulations or otherwise. In this regard, the privacy risk footprint determination system 101 may help users stay aware ever-changing privacy settings and provide appropriate guidelines for the settings. The privacy risk footprint determination system 101 may also inform users about personalized privacy best practices at certain intervals.

As described herein, the privacy risk footprint determination system 101 may provide context-based privacy incident protection. This may include monitoring a user's activities in context, e.g., using machine learning techniques that include consideration of information shared on social media, job searching actions, moving activities, shopping, and the like. An alert may be generated based on determining that a risk exceeds a threshold. Per user consent, the privacy risk footprint determination system 101 may file detected privacy incidents with the relevant social media service provider. The privacy risk footprint determination system 101 may be in operable connections to a user device, e.g., to receive a subscription to a privacy service, to receive configurable options for the privacy service, to receive user consent to review user data, to receive additional details about contextual situations, and the like.

As described herein, a privacy context may be defined by the interaction between a user's sharing activities and a user's specific situations. Some examples of privacy contexts may include sharing location data when traveling for work or traveling for leisure, location sharing data tagged to photos or messages, sharing personal data when working or sharing work related data in private life, and the like. The privacy risk footprint determination system 101 may analyze a contextual situation to assess a context-based privacy risk index or score. The privacy risk footprint determination system 101 may help the user with assessing the impact of a privacy incident in specific contexts, such as the disclosure of a home location, a potential reputation impact in public or private life, and the like.

In some instances, the privacy risk footprint determination system 101 may include an incognito configuration tool that may understand a contextual situation and respond to protect the user by protecting or hiding the corresponding sensitive personal data. The privacy risk footprint determination system 101 may be used for specific time frames in the past or future, and/or may be used in real-time. The privacy risk footprint determination system 101 may provide default appropriate configuration options for various user accounts. The privacy risk footprint determination system 101 may allow a user to subscribe to various privacy contexts and select the appropriate configuration options. The privacy risk footprint determination system 101 may provide centralized control to change the privacy settings on accounts linked to a particular user to alleviate the user from complexity of settings. Configurable options may include display of the privacy risk index or score for various subscribed contexts, alerts being received in real-time or on-demand, actions to remediate privacy incidents, automatic updating of privacy or security settings related to contexts on behalf of the user to hide sensitive data (e.g., activating the incognito mode), automatically turning location sharing on or off based on contexts, and the like.

The privacy risk footprint determination system 101 may take advantage of a number of ongoing trends that allow users to better manage their data. For example, data may be critical to support business models, and personalize product offerings and customer experiences. Privacy laws are changing, in that they may grant rights to users to their data thereby putting users in control of their data. Additionally, relationships in user data are highly predictive of outcomes, behaviors, and risks. The privacy risk footprint determination system 101 may personalize risk graph visions by using data available with user consent and third parties to help users manage risk in their lives and personalize experience.

The privacy risk footprint determination system 101 may employ a machine learning model that may consider a number of hypotheses for determination of privacy incidents. Such hypotheses may include that people with similar social media activity, educational level, shopping habits, travel patterns, mobile apps usage pattern, and the like having similar risk profiles, that data obtained with user consent can be used to create proxy risk factors for traditional risk factors, that data obtained with user consent can be used to identify new user risks and create business opportunities, and the like.

Although recommendation system 110, classification model 108, and privacy risk metric application 106 are shown as separate elements from the privacy risk footprint determination system 101, one or more of them may be within the same structure. In particular, privacy risk footprint determination system 101 may be configured to perform one or more (or all) functions performed by classification model 108, recommendation system 110, and privacy risk metric application 106.

In one or more arrangements, aspects of the present disclosure may be implemented with a computing device. FIG. 2 illustrates a block diagram of an example privacy risk footprint and incident protection device 200 that may be used in accordance with aspects described herein. The privacy risk footprint and incident protection device 200 may be a computing device such as a personal computer (e.g., a desktop computer), server, laptop computer, notebook, tablet, smartphone, etc.

The privacy risk footprint and incident protection device 200 may have a data collection module 201 for retrieving and/or analyzing one or more characteristics of applications or services, as described herein. The data collection module 201 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 201 may refer to the software and/or hardware used to implement the data collection module 201. In cases where the data collection module 201 includes one or more processors, such processors may be specially configured to perform the processes disclosed herein. Additionally, or alternatively, the data collection module 201 may include one or more processors configured to execute computer-executable instructions, which may be stored on a storage medium, to perform the processes disclosed herein. In some examples, privacy risk footprint and incident protection device 200 may include one or more processors 203 in addition to, or instead of, the data collection module 201. The processor(s) 203 may be configured to operate in conjunction with data collection module 201. Both the data collection module 201 and the processor(s) 203 may be capable of controlling operations of privacy risk footprint and incident protection device 200 and its associated components, including RAM 205, ROM 207, an input/output (I/O) module 209, a network interface 211, and memory 213. For example, data collection module 201 and processor(s) 203 may each be configured to read/write computer-executable instructions and other values from/to the RAM 205, ROM 207, and memory 213.

The I/O module 209 may be configured to be connected to an input device 215, such as a microphone, keypad, keyboard, touchscreen, and/or stylus through which a user of privacy risk footprint and incident protection device 200 may provide input data. The I/O module 209 may also be configured to be connected to a display device 217, such as a monitor, television, touchscreen, etc., and may include a graphics card. The display device 217 and input device 215 are shown as separate elements from the privacy risk footprint and incident protection device 200; however, they may be within the same structure. On some privacy risk footprint determination devices 200, the input device 215 may be operated by a user to interact with data collection module 201, including providing information about user information, account information, rating information, privacy settings, etc. System administrators may use the input device 215 to make updates to data collection module 201, such as software updates. Meanwhile, the display device 217 may assist the system administrators and users to confirm/appreciate their inputs.

The memory 213 may be any computer-readable medium for storing computer-executable instructions (e.g., software). The instructions stored within memory 213 may enable the privacy risk footprint and incident protection device 200 to perform various functions. For example, memory 213 may store software used by the privacy risk footprint and incident protection device 200, such as an operating system 219 and application programs 221, and may include an associated database 223.

Although not shown in FIG. 2, various elements within memory 213 or other components in the privacy risk footprint and incident protection device 200 may include one or more caches, for example, CPU caches used by the processor(s) 203, page caches used by the operating system 219, disk caches of a hard drive, and/or database caches used to cache content from database 223. For embodiments including a CPU cache, the CPU cache may be used by one or more processors in the processor 203 to reduce memory latency and access time. In such examples, the processor 203 may retrieve data from or write data to the CPU cache rather than reading/writing to memory 213, which may improve the speed of these operations. In some examples, a database cache may be created in which certain data from a central database of, for example, one or more servers 245 (e.g., an application server, a cloud service provider, etc.) is cached in a separate smaller database on an application server separate from the database server. For instance, in a multi-tiered application, a database cache on an application server can reduce data retrieval and data manipulation time by not having to communicate over a network with a back-end database server such as, for example, one or more servers 245. These types of caches and others may be included in various embodiments, and may provide potential advantages in certain implementations of retrieving and analyzing the one or more characteristics, such as faster response times and less dependence on network conditions when transmitting/receiving data from one or more servers 245.

The network interface 211 may allow privacy risk footprint and incident protection device 200 to connect to and communicate with a network 230. The network 230 may be any type of network, including a local area network (LAN) and/or a wide area network (WAN), such as the Internet, a cellular network, or satellite network. Through the network 230, privacy risk footprint and incident protection device 200 may communicate with one or more other computing devices, such as laptops, notebooks, smartphones, tablets, personal computers, servers, vehicles, home management devices, home security devices, smart appliances, etc. Through the network 230, privacy risk footprint and incident protection device 200 may communicate with one or more servers 245 to exchange information related to the one or more characteristics. Through the network 230, privacy risk footprint and incident protection device 200 may communicate with one or more computing devices 240, such as laptops, notebooks, smartphones, tablets, personal computers, servers, vehicles, home management devices, home security devices, smart appliances, etc. The computing devices 240 may also be configured in a similar manner as privacy risk footprint and incident protection device 200. In some embodiments the privacy risk footprint and incident protection system 100 may be connected to the computing devices 240 to form a "cloud" computing environment.

The network interface 211 may connect to the network 230 via communication lines, such as coaxial cable, fiber optic cable, etc., or wirelessly using a cellular backhaul or a wireless standard, such as IEEE 802.11, IEEE 802.15, IEEE 802.16, etc. Further, the network interface 211 may use various protocols, including TCP/IP, Ethernet, File Transfer Protocol (FTP), Hypertext Transfer Protocol (HTTP), etc., to communicate with other user computing devices 240, and/or servers 245.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed, and the various computing devices and mobile device location and configuration system components described herein may be configured to communicate using any of these network protocols or technologies.

Figure 3:
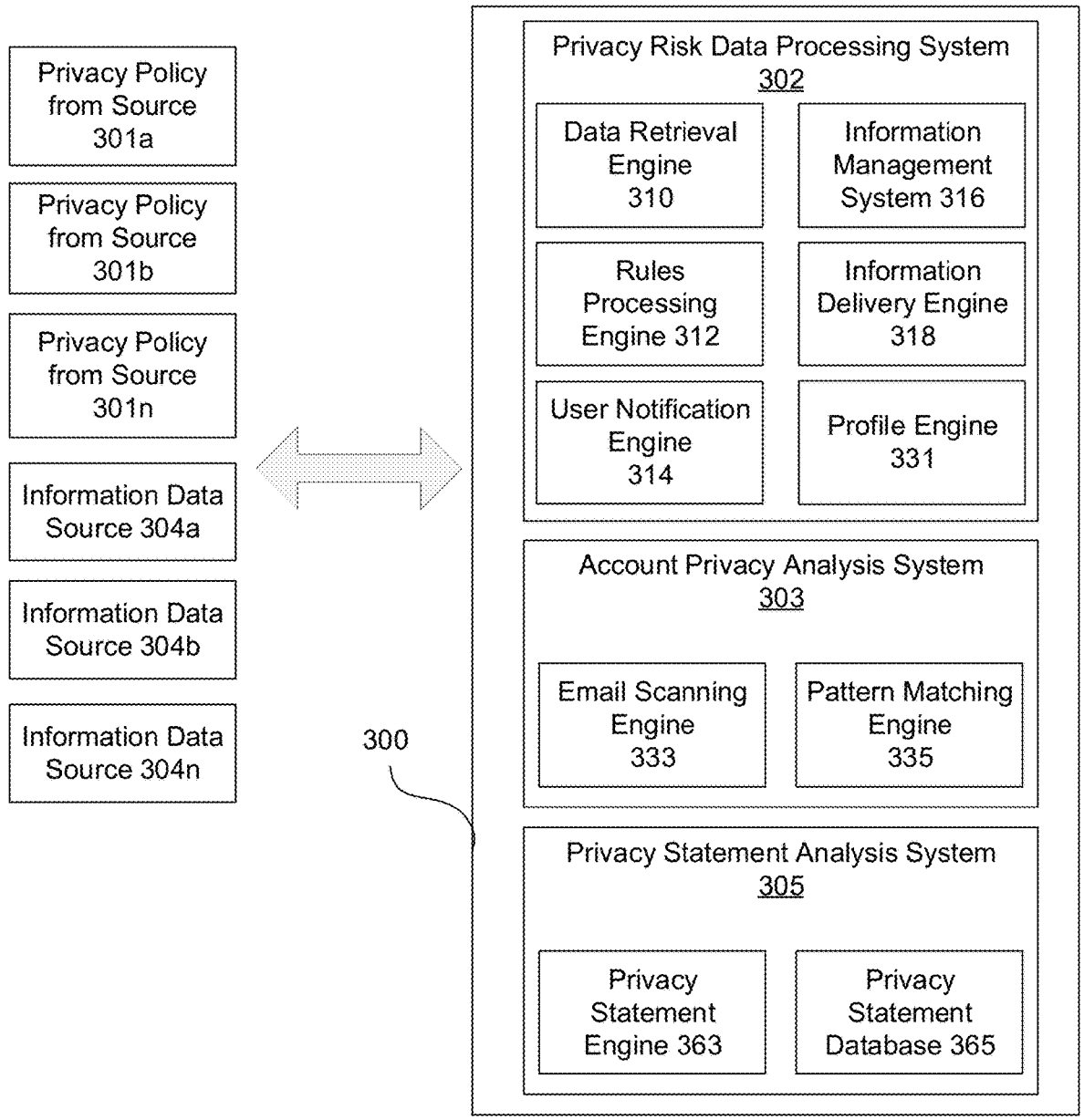
FIG. 3 illustrates a block diagram of a privacy risk footprint and incident protection system in accordance with one or more aspects described herein

FIG. 3 illustrates a block diagram of a privacy risk footprint and incident protection system 300 that collects information from various information sources to assist a user in keeping track of numerous accounts and displays to a user what type of information that may be collated and shared about the user with third parties. As shown in FIG. 3, privacy risk footprint and incident protection system 300 may communicate with a plurality of information data sources 304a, 304b, . . . 304n to collect information related to the user to determine next steps. In addition, privacy risk footprint and incident protection system 300 may collect and analyze privacy policies from websites for financial and other subscription companies or institutions. The privacy policies may be found on each website for a related application or service. For example, the privacy risk footprint and incident protection system 300 may collect and analyze privacy policies 301a, 301b, . . . 301n from different financial institutions.

In some embodiments, the privacy risk footprint and incident protection system 300 may comprise a privacy risk data processing system 302, an account privacy analysis system 303, and a privacy statement analysis system 305. The privacy risk data processing system 302 may retrieve information from the plurality of information data sources 304a-304n in order to determine the digital presence of a user. The data retrieval engine 310 may be configured to monitor (e.g., continuously or at specified intervals) each of the information data sources 304a-304n and report data of interest from any one of these data sources to the privacy risk footprint and incident protection system 300. For example, the data retrieval engine 310 may monitor social media sources to determine if account information associated with the user is detected. If the information is detected, it may be passed on to the privacy risk footprint and incident protection system 300 for analysis. In another example, the data retrieval engine 310 may interface with one or more digital accounts (banking accounts, social media accounts, digital storefronts, etc.) to determine if accounts are created, active, and/or in use. Account information may be passed on to the privacy risk footprint and incident protection system 300.

In an embodiment, the collected information regarding a user may be used to determine an online presence for a user (e.g., the spread of information or "footprint" left by a user in digital spaces). In an embodiment, determined social media sources of the user may be monitored to determine if something malicious or believed to breach the terms of use of the site has been detected. Such monitoring may detect unauthorized use of the user's social media accounts.

In some examples, privacy risk data processing system 302 may generate a user profile at profile engine 331. The user profile may be generated using, at least in part, data received and/or collected from information data sources 304-304n and privacy policies 301a-301n. The user profile may include details of the user including but not limited to a user's name, age, address, driver's license number, credit card or bank information, insurance policies, networked devices associated with the user, and the like. In an embodiment, the user may manually enter additional information or may confirm information found in a related user profile through a mobile application or computing device interface. Additional information that may be entered by the user includes financial account details, verification of online accounts used by a user, and the like.

In some arrangements, privacy risk data processing system 302 may scan a user device to determine potential security threats. Based on the scan a device profile may be generated at profile engine 331. The device profile may be analyzed to determine if the device has any known vulnerabilities based on the installed hardware components and loaded software applications. In an embodiment, the user device and the results of the device scan may be added to the user's generated profile.

In some embodiments, the privacy risk footprint and incident protection system 300 may calculate risk based on the data gathered from the information data sources 304a-304n. For example, the rules processing engine 312 may analyze the data retrieved from information data sources 304a-304n by the data retrieval engine 310 according to preset rules and/or algorithms in order to determine the likelihood of a data breach based on the digital presence of the user.

In some examples, the privacy risk footprint and incident protection system 300 may determine when and through which means to notify a user of the risks of a data breach and/or evidence of a data breach according to preset rules and strategies calculated from the data gathered from the information data sources 304a-n. For example, the user notification engine 314 may determine a time to contact the user with a message and/or notification generated by the privacy risk footprint and incident protection system 300 upon analyzing the activities of the user and processing such activities according to risk matrices maintained by privacy risk footprint and incident protection system 300.

In some embodiments, the privacy risk footprint and incident protection system 300 may manage the various activities of a user, and the status of various accounts associated with the user. For example, the information management system 316 may keep track of all of the information received from information data sources 304a-304n and may also manage a schedule of message delivery by communicating with the user notification engine 314. In another example, the privacy risk footprint and incident protection system 300 may notify the user whenever an account is accessed at an unexpected time and/or from an unexpected location.

In some embodiments, the privacy risk footprint and incident protection system 300 may determine which channel to use to communicate the decision of a privacy strategy computed at the privacy risk footprint and incident protection system 300. For example, based on one or more user settings, the information delivery engine 318 may determine that a mobile application accessible to the user is the most appropriate channel on which to deliver a privacy best practices report to the user and/or other target audience.

In some additional embodiments, account privacy analysis system 303 may generate a listing for the user of discovered online accounts associated with the user. The accounts may be categorized into various groups such as financial accounts and subscriptions associated with the user. The categorized listings may assist a user in keeping track of their numerous online accounts all of which may contain various forms of confidential information.

In an embodiment, account privacy analysis system 303 may monitor a user's email accounts to determine a listing of the user accounts with financial institutions. Similarly, a user's email accounts may also be monitored to determine the number of online subscription accounts associated with the user. For example, email scanning engine 333 may scan a user's last 45 days of emails and, using pattern matching engine 335, may determine the number of financial and online subscription accounts associated with the user. Those skilled in the art will realize that any number of emails or all emails associated with a user may be scanned and analyzed based on adjustable selections and preferences.

In some example arrangements, account privacy analysis system 303 may generate separate lists for a user listing all of the user's discovered financial accounts and all of the user's online subscriptions. The generated lists may be used to assist the user in closing certain accounts in order to reduce the risk of confidential information being disclosed. In another embodiment, account privacy analysis system 303 may, upon discovery of a user's account, allow the user to globally change information such as a user address or phone number across all of the discovered accounts simultaneously. Such aggregation and consolidation may allow a user to update and manage numerous accounts efficiently.

In an embodiment, the privacy risk footprint and incident protection system 300 may collect privacy policies or statements from financial institutions and businesses that are utilized by the user. A privacy statement may specify a company's practices regarding the collection, use, and sharing of customer data both internally and externally with third parties. In order to protect confidential information, a user may benefit by being made aware of what confidential information each of those accounts includes, how that confidential information may be used, and whether it can be shared. Privacy policies and statements from most financial institutions and businesses may be found online on each entities website.

Privacy policies from numerous collected institutions and businesses may be fed into a machine learning engine to determine information such as what information is being collected from a user, what the information for the user will be used for by the business, and whether the business will make the information available to third parties. Additional information that may be determined from the analyzed privacy policy may include user's rights and choices to access the data and make corrections, rights or choices regarding data collection, how cookies are used, contact information for an organization, the effective date of the policy, and the like.

In an embodiment, each discovered account for a user may be matched with the associated financial institution or businesses privacy statement. For instance, a discovered bank account number for a user may be determined to be from a specific financial institution. The privacy risk footprint and incident protection system 300 may retrieve, e.g., from a database, information regarding a privacy statement from the specific financial institution to be displayed to the user. The privacy statement may be retrieved and analyzed in real-time so as to provide the user information related to how confidential information is to be treated by the specific financial institution.

The privacy risk footprint and incident protection system 300 may display to the user a listing of all the discovered accounts from the email scan and, for each discovered account, a listing of all the data being collected for each account, information regarding what the collected information is being used for, and information regarding the sharing of the collected data with any third parties. In an embodiment, information regarding the sharing of the collected data with third parties may include a yes or no value or may additionally include information such as the intended use of the data by each third party. For example, privacy statement analysis system 305 may determine if a discovered financial institution privacy statement is contained in privacy statement database 365. If the privacy statement database 365 does not contain the requested privacy statement the requested privacy statement may be extracted and retrieved by privacy risk analysis and incident detection system 301 and analyzed by privacy statement engine 363.

The privacy statement engine 363 may include a conical data model and a supervised machine learning model for analyzing privacy statements. For instance, exemplary privacy statements may be tagged and used to build a classifier for analyzing subsequent privacy statements as typical privacy statements include sections of information discussing the various types of information being collated from a user, how such information may be used, and whether third parties will have access to the collected information. The added metadata to the exemplary privacy statements may be used by privacy statement engine 363 to identify information of interest in additional scanned privacy statements. In an embodiment, the output of privacy statement engine 363 may be stored in privacy statement database 365.

The privacy statement engine 363 may adjust the tagging scheme based on the accuracy of the results and the variability of the terminology used in different privacy statements. In some examples, the privacy statement engine 363 may be used with different languages other than English.

The privacy statement engine 363 may compare privacy statements of similar classifications of business. Such analysis may result in faster processing times of additional privacy statements, with new additional provisions being tagged. In some examples, the privacy statement engine 363 may determine additional information, such as data security information, compliance information, data retention information, user control information, and the like. If the privacy statement engine 363 does not find any data of interest in a privacy policy, a flag may be set for further review of the privacy statement. The flag may be stored in privacy statement database 365.

As described herein, a method is provided for context-based privacy risk footprint determination and incident protection. For example, a method disclosed herein may include receiving, from a user device, an enrollment notification of a user enrolling in a privacy incident protection application. The enrollment notification may include user account information associated with one or more user accounts of the user, and a plurality of contextual settings. The method may include determining a risk footprint associated with the user based on the user account information, receiving an indication of an incident based on monitoring the one or more user accounts and based on the risk footprint, and transmitting an incident notification to a data server provider associated with the incident. The incident notification may include instructions to delete compromised data associated with the incident. The method may include determining a privacy risk score by applying a machine learning model to user activity information associated with the one or more user accounts, and calculating the risk footprint based, at least in part, on the privacy risk score. In some examples, the method may include generating a privacy risk footprint interface for display on the user device. The privacy risk footprint interface may include at least one interactive risk element associated with the one or more user accounts and the plurality of contextual settings.

Figure 4:
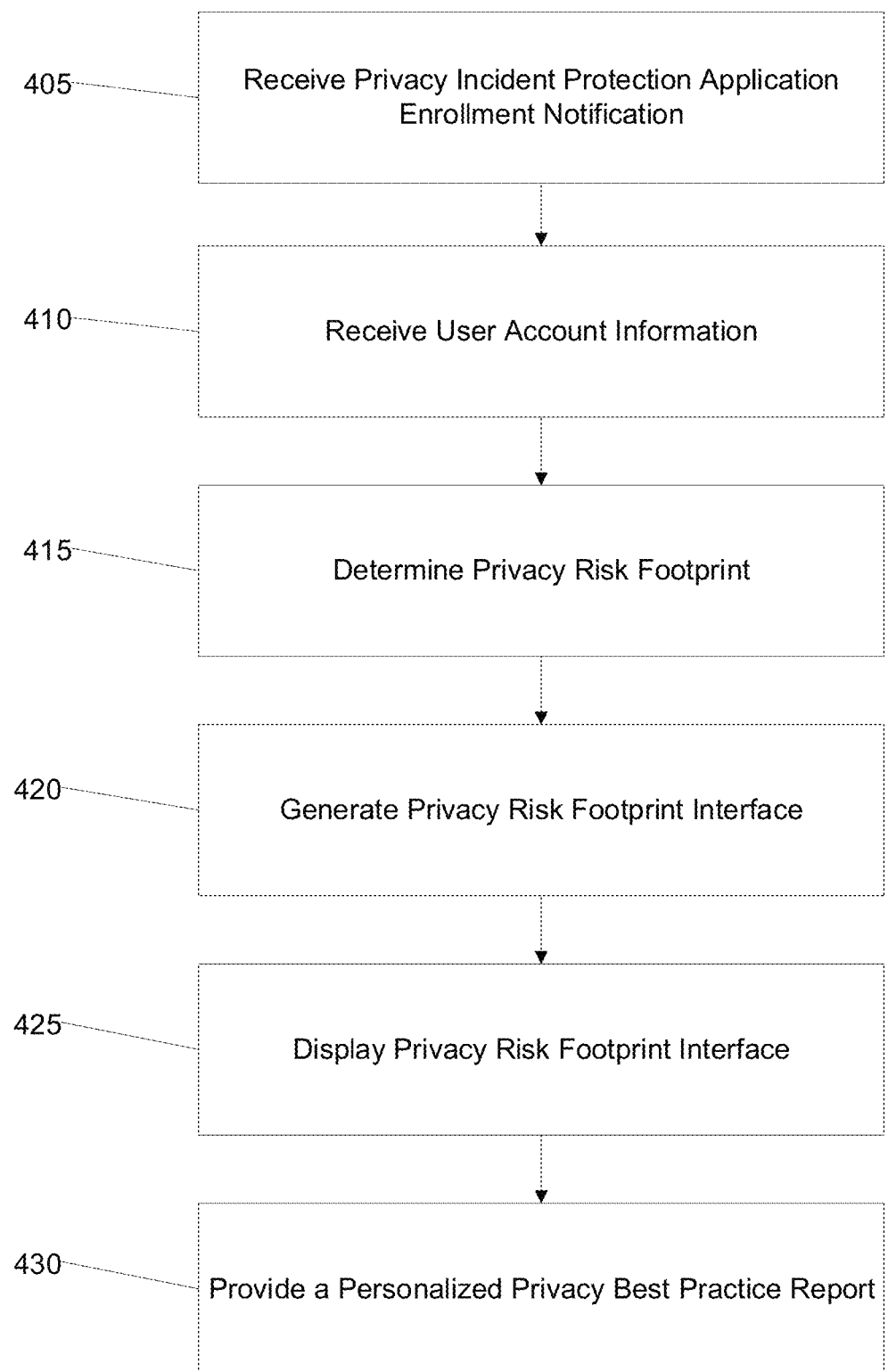
FIG. 4 illustrates a method for performing privacy risk footprint determination functions for applications or services in accordance with one or more aspects described herein.

FIG. 4 illustrates a method for performing privacy risk footprint determination functions for applications or services in accordance with one or more aspects described herein.

At step 405, a privacy risk footprint and incident protection system may receive, from a user computing device and over a network, a notification of a user enrollment in a privacy incident protection application. For example, the privacy incident protection application may be associated with the privacy risk footprint and incident protection system. The notification of user enrollment may be received in response to one or more user selections from a user interacting with the user device to select an enrollment in the privacy incident protection application.

At step 410, the privacy risk footprint and incident protection system may receive, from the user computing device and over the network, user account information. In some instances, the user account information may be received simultaneously with the notification of user enrollment in the privacy incident protection application. In some instances, receiving user account information at step 410 may be contingent on first receiving the notification of user enrollment in the privacy incident protection application at step 405. The user account information received at step 410 may include a plurality of contextual settings associated with the user. In some examples, the plurality of contextual settings may include characteristics associated with patterns of behavior or account use by the user. In some examples, the plurality of contextual settings may include user account preferences, user account activity, user account information sharing activity, user account settings, or user device settings, and the like.

At step 415, the privacy risk footprint and incident protection system may determine a privacy risk footprint or a privacy risk footprint associated with the user based on the user account information. For example, the privacy risk footprint and incident protection system may utilize one or more machine learning tools such as, for example, a linear regression, a decision tree, a support vector machine, a random forest, a k-means algorithm, gradient boosting algorithms, dimensionality reduction algorithms, and so forth, to group together applications or services associated with the user account information and that have been determined to share one or more characteristics. In some examples, determining the privacy risk footprint may include determining a privacy risk score by applying a machine learning model to user activity information associated with the one or more user accounts and calculating the risk footprint based, at least in part, on the privacy risk score. In some examples, determining the risk footprint may include computing a privacy risk score using graphic analytics based on the plurality of contextual setting and user activity information associated with the one or more user accounts. In some arrangements, an alert may be transmitted to the user device upon determining that the risk footprint exceeds a risk threshold.

At step 420, the privacy risk footprint and incident protection system may generate a privacy risk footprint interface. For example, the privacy risk footprint interface may be generated based on the privacy risk footprint determined at step 415 and/or the user account information received at step 410. In some instances, the privacy risk footprint interface may be generated for display on a user device and in accordance with one or more settings of the user device, such as screen size or type of network connection.

Figure 6:
FIG. 6 illustrates an example graphical user interface for providing interactive privacy risk footprint determinations in accordance with one or more aspects described herein.

At step 425, the user device may display the privacy risk footprint interface. For example, the privacy risk footprint and incident protection system may generate and/or send information to the user device which may cause the user device to generate, display, and/or otherwise present a graphical user interface similar to graphical user interface 600, which is illustrated in FIG. 6. As seen in FIG. 6, the graphical user interface 600 may include text and/or other information relating to the privacy risk footprint (e.g., "We have detected 87 accounts associated with your user information."), as well as one or more components of additional user account information and one or more interactive elements. For example, the privacy risk footprint interface may include at least one interactive risk element associated with the one or more user accounts and the plurality of contextual settings. The privacy risk footprint interface may include a privacy risk score element configured to interactively display the risk score and user account information related to the risk score (e.g., "View Your Privacy Risk Score" as shown in the graphical user interface 600 of FIG. 6). The at least one interactive risk element may include an information protection interactive element displaying instructions to protect, conceal, or delete a component of compromised user account information determined based on the risk footprint. In some examples, the at least one interactive risk element may include an account privacy interactive element displaying instructions to adjust privacy settings on one or more user accounts, e.g., based on the privacy risk footprint or based on the plurality of contextual settings (e.g., "We recommend modifying privacy settings in 24 of your accounts. Click here to modify your privacy settings." as shown in the graphical user interface 600 of FIG. 6).

At step 430, the privacy risk footprint and incident protection system may provide a personalized privacy best practice report to the user. For example, the personalized privacy best practice report may include one or more recommendations determined based on the privacy risk footprint determined at step 415 and/or the user account information received at step 410. The one or more recommendations may include a recommendation to switch to another application or service with a lower privacy risk than a particular application or service already used by the user. The one or more recommendations may include a recommendation to add a new application or service to be used in conjunction with a particular application or service already used by the user. The personalized privacy best practice may be generated using a recommendation engine of the privacy risk footprint and incident protection system and may subsequently be transmitted to the user device for display thereon. In that regard, the personalized privacy best practice may be configured to be displayed on an interface of the user device.

In some embodiments, the process may return to step 405 to receive a new notification of a second privacy incident protection application enrollment, e.g., with one or more different privacy risk footprint determination and incident protection features than a first, initially-received privacy incident protection application.

Figure 5:
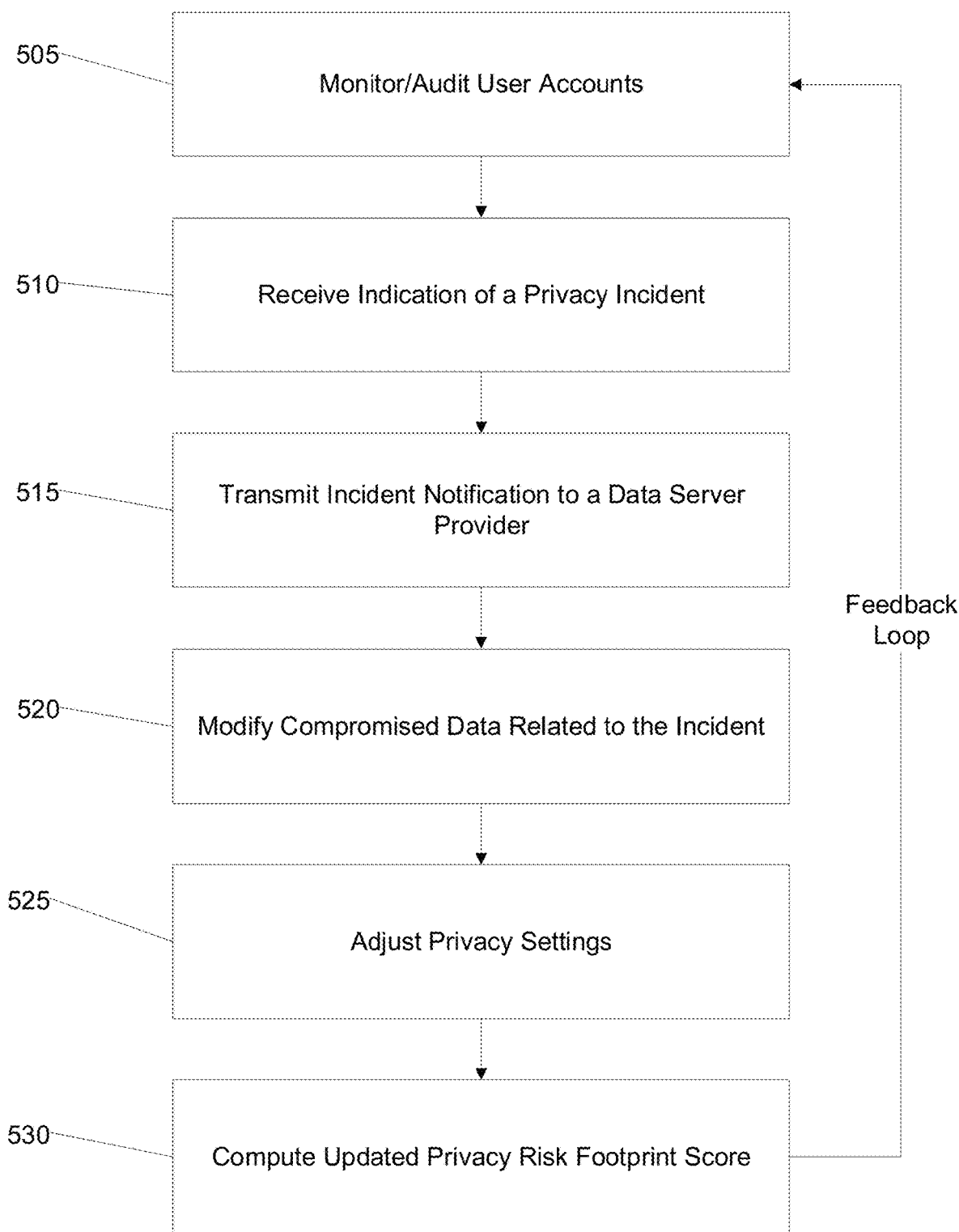
FIG. 5 illustrates a method for performing privacy risk incident protection functions for applications or services in accordance with one or more aspects described herein.

FIG. 5 illustrates a method for performing privacy risk incident protection functions for applications or services in accordance with one or more aspects described herein.

At step 505, the privacy risk footprint and incident protection system may monitor the one or more user accounts associated with the user. For example, the one or more user accounts may be determined based on the user account information received at step 410. One or more aspects of monitoring or auditing the one or more user accounts may be based on the user enrollment in the privacy incident protection application received at step 405. In some examples, monitoring the one or more user accounts at step 505 may include performing a user account audit at an audit interval. The audit interval may be selected based on the privacy risk footprint, the plurality of contextual setting, other user input information, and the like. Monitoring the one or more user accounts at step 505 may include performing a user account audit responsive to receiving audit instructions from the user device. In some examples, monitoring the one or more user accounts at step 505 may include receiving privacy contextual information associated with user activity on the one or more user accounts. The privacy contextual information may include at least one of a location descriptor, an activity descriptor, or a privacy policy descriptor. In some examples, the privacy contextual information may include an interaction between a user sharing activity and one or more situational settings associated with the user sharing activity.

At step 510, the privacy risk footprint and incident protection system may receive an indication of a privacy incident based on monitoring the one or more user accounts. For example, the privacy incident may be determined based on one or more aspects of the privacy risk footprint and/or the plurality of contextual settings. In some examples, the privacy risk footprint and incident protection system may transmit an incident notification user interface to the user device. The incident notification user interface may be configured to display information related to the incident notification on the user device.

At step 515, the privacy risk footprint and incident protection system may transmit an incident notification to a data server provider associated with the privacy incident. The incident notification may include instructions to delete, mask, or scrub compromised data associated with the privacy incident. The data server provider may be determined based on a user account from which the privacy incident occurred. In that regard, the data server provider may host, own, implement, or otherwise manage an application or service associated with the relevant user account from which the privacy incident occurred.

At step 520, the data server provider may modify (e.g., delete, mask, or scrub) the compromised data related to the privacy incident in response to the incident notification transmitted at step 515. In some examples, deleting the compromised data may include sending an information deletion verification to the privacy risk footprint and incident protection system upon the compromised data being deleted, masked, or scrubbed. In some instances, the privacy risk footprint and incident protection system may automatically mask user information related to the one or more user accounts in accordance with the plurality of contextual settings.

At step 525, the privacy risk footprint and incident protection system may adjust one or more privacy settings associated with the one or more user accounts. For example, the one or more privacy settings may be adjusted based on the privacy incident, e.g., to ensure that a similar privacy incident will not likely be repeated. As another example, the one or more privacy setting may be adjusted based on monitoring or auditing the one or more user accounts, e.g., and based on learning new user behaviors or patterns associated with the one or more user accounts. Adjusting the privacy setting at step 525 may include transmitting instructions to a relevant data server provider that maintains the user settings associated with a given account, or transmitting a notification to a user device relating to the one or more privacy settings to be adjusted.

At step 530, the privacy risk footprint and incident protection system may compute an updated privacy risk footprint score. For example, the updated privacy risk footprint score may take into consideration the one or more privacy settings that were adjusted at step 525. As another example, the information related to the privacy incident received at step 510, or other information observed as part of monitoring the one or more user accounts at step 505.

In some embodiments, the process may return to step 505 to continue to monitor the one or more user accounts.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps illustrated may be optional in accordance with aspects of the invention.

What is claimed is:

1. An apparatus comprising:
one or more processors; and
memory storing computer-readable instructions that, when executed by the one or more processors, cause the apparatus to:
receive, from a user device, notification of a user enrolling in a privacy incident protection application;
receive, from the user device, user account information associated with one or more user accounts of the user, wherein the user account information includes a plurality of contextual settings;
automatically mask user information related to the one or more user accounts in accordance with the plurality of contextual settings;
determine a risk footprint associated with the user based on the user account information;
monitor the one or more user accounts, the monitoring the one or more user accounts includes receiving privacy contextual information associated with user activity on the one or more user accounts, the privacy contextual information including at least one of a location descriptor, an activity descriptor, or a privacy policy descriptor;
receive an indication of an incident based on monitoring the one or more user accounts and based on the risk footprint; and
transmit an incident notification to a data server provider associated with the incident, the data server provider providing at least one of hosting, owning, implementing, or managing an application or service associated with the one or more user accounts of the user, wherein the incident notification includes instructions to cause the data server provider to modify data associated with the incident.

2. The apparatus of claim 1, wherein the memory stores additional computer-readable instructions that, when executed by the one or more processors, further cause the apparatus to:
generate a privacy risk footprint interface for display on the user device, wherein the privacy risk footprint interface includes at least one interactive risk element associated with the one or more user accounts and the plurality of contextual settings.

3. The apparatus of claim 2, wherein the privacy risk footprint interface includes a privacy risk score element configured to interactively display a privacy risk score and user account information related to the privacy risk score.

4. The apparatus of claim 2, wherein the at least one interactive risk element includes an information protection interactive element displaying instructions to protect a component of compromised user account information determined based on the risk footprint.

5. The apparatus of claim 2, wherein the at least one interactive risk element includes an account privacy interactive element displaying instructions to adjust privacy setting on one or more user accounts.

6. The apparatus of claim 1, wherein the memory stores additional computer-readable instructions that, when executed by the one or more processors, further cause the apparatus to:
transmit an incident notification user interface to the user device, wherein the incident notification user interface is configured to display information related to the incident notification on the user device.

7. The apparatus of claim 1, wherein the plurality of contextual settings includes at least one of: user account preferences, user account activity, user account information sharing activity, user account settings, or user device settings.

8. The apparatus of claim 1, wherein determining the risk footprint includes:
determining a privacy risk score by applying a machine learning model to user activity information associated with the one or more user accounts, and
calculating the risk footprint based, at least in part, on the privacy risk score.

9. The apparatus of claim 1, wherein determining the risk footprint includes computing a privacy risk score using graphic analytics based on the plurality of contextual settings and user activity information associated with the one or more user accounts.

10. The apparatus of claim 1, wherein the memory stores additional computer-readable instructions that, when executed by the one or more processors, further cause the apparatus to:
transmit an alert to the user device upon determining that the risk footprint exceeds a risk threshold.

11. The apparatus of claim 1, wherein the memory stores additional computer-readable instructions that, when executed by the one or more processors, further cause the apparatus to:
generate, using a recommendation engine, a personalized privacy best practice report based on the risk footprint; and
transmit the personalized privacy best practice report to the user device, wherein the personalized privacy best practice report is configured to be displayed on an interface of the user device.

12. The apparatus of claim 1, wherein monitoring the one or more user accounts includes performing a user account audit at an audit interval, wherein the audit interval is selected based on the risk footprint.

13. The apparatus of claim 1, wherein monitoring the one or more user accounts includes performing a user account audit responsive to receiving audit instructions from the user device.

14. The apparatus of claim 1, wherein the privacy contextual information includes an interaction between a user sharing activity and one or more situational settings associated with the user sharing activity.

15. A method comprising:
receiving, from a user device, an enrollment notification of a user enrolling in a privacy incident protection application, wherein the enrollment notification includes user account information associated with one or more user accounts of the user, and a plurality of contextual settings;
automatically mask user information related to the one or more user accounts in accordance with the plurality of contextual settings;
determining a risk footprint associated with the user based on the user account information;

monitor the one or more user accounts, the monitoring the one or more user accounts includes receiving privacy contextual information associated with user activity on the one or more user accounts, the privacy contextual information including at least one of a location descriptor, an activity descriptor, or a privacy policy descriptor;

receiving an indication of an incident based on monitoring the one or more user accounts and based on the risk footprint; and transmitting an incident notification to a data server provider associated with the incident, the data server provider providing at least one of hosting, owning, implementing, or managing an application or service associated with the one or more user accounts of the user, wherein the incident notification includes instructions to cause the data server provider to modify data associated with the incident.

16. The method of claim 15, further comprising:
determining a privacy risk score by applying a machine learning model to user activity information associated with the one or more user accounts, and
calculating the risk footprint based, at least in part, on the privacy risk score.

17. The method of claim 15, further comprising:
generating a privacy risk footprint interface for display on the user device, wherein the privacy risk footprint interface includes at least one interactive risk element associated with the one or more user accounts and the plurality of contextual settings.

18. A system comprising:
a first computing device in signal communication with at least one other computing device, wherein the first computing device comprises:
a processor; and
memory storing instructions that, when executed by the processor, cause the first computing device to:
receive, from a user device, notification of a user enrolling in a privacy incident protection application;
receive, from the user device, user account information associated with one or more user accounts of the user, wherein the user account information includes a plurality of contextual settings;
automatically mask user information related to the one or more user accounts in accordance with the plurality of contextual settings;
determine a risk footprint associated with the user based on the user account information;
monitor the one or more user accounts, the monitoring the one or more user accounts includes receiving privacy contextual information associated with user activity on the one or more user accounts, the privacy contextual information including at least one of a location descriptor, an activity descriptor, or a privacy policy descriptor;
receive an indication based on monitoring the one or more user accounts and based on the risk footprint;
transmit a notification user interface to the user device, wherein the notification user interface is configured to display information related to the indication on the user device; and
transmit an incident notification to a data server provider associated with the indication, the data server provider providing at least one of hosting, owning, implementing, or managing an application or service associated with the one or more user accounts of the user, wherein the incident notification includes instructions to cause the data server provider to modify data associated with the indication.

* * * * *